Figure 1:
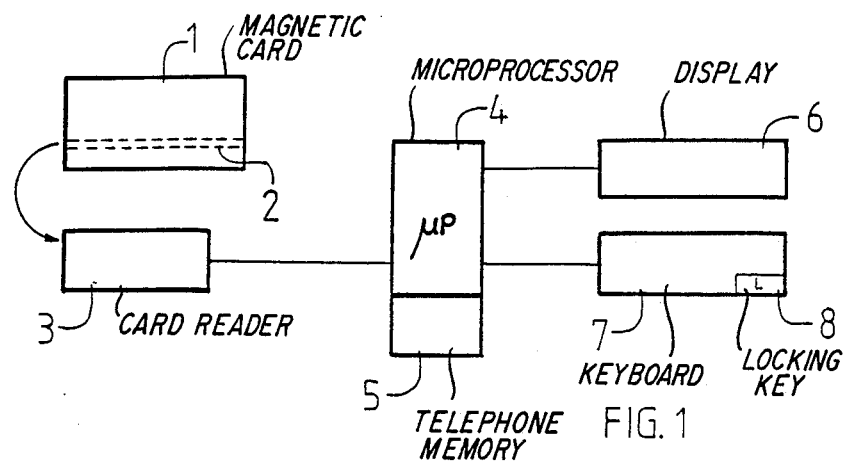

United States Patent [19]

Kemppi

[11] Patent Number: 4,868,846
[45] Date of Patent: Sep. 19, 1989

[54] METHOD FOR LOCKING TO THE USER'S CARD IN A PORTABLE RADIO TELEPHONE

[75] Inventor: Yrjö Kemppi, Salo, Finland

[73] Assignee: Nokia Mobira Oy, Salo, Finland

[21] Appl. No.: 221,079

[22] Filed: Jul. 19, 1988

[30] Foreign Application Priority Data

Jul. 29, 1987 [FI] Finland .................................. 873309

[51] Int. Cl.⁴ .............................................. H01M 11/00
[52] U.S. Cl. ....................................... 379/144; 379/91;
235/382; 235/486; 340/825.31
[58] Field of Search .................. 379/144, 91; 235/380,
235/382, 486; 340/825.31, 825.33, 825.34

[56] References Cited

U.S. PATENT DOCUMENTS

| | | | |
|---|---|---|---|
| 4,439,670 | 3/1984 | Bosset et al. | 235/382 |
| 4,480,181 | 10/1984 | Fisher | 235/486 |
| 4,670,746 | 6/1987 | Taniguchi et al. | 340/825.31 |
| 4,759,056 | 7/1988 | Akiyama | 379/197 |
| 4,811,387 | 3/1989 | Hollewed et al. | 379/144 |
| 4,814,593 | 3/1989 | Reichardt et al. | 235/482 |

FOREIGN PATENT DOCUMENTS

| | | | |
|---|---|---|---|
| 0254316 | 1/1988 | European Pat. Off. | 235/486 |
| 2607290 | 5/1988 | France | 235/486 |
| 0125178 | 7/1983 | Japan | 235/486 |
| 2164227 | 3/1986 | United Kingdom . | |

Primary Examiner—Robert Lev
Attorney, Agent, or Firm—Armstrong, Nikaido, Marmelstein, Kubovcik & Murray

[57] ABSTRACT

The invention relates to a method for the use of a portable radio telephone, which has a processor (4) controlling and supervising the operation, a keyboard (7) and a display (6), and a card reader (3), in which case, when the radio telephone is being used, the user identification data required by the radio telephone system are read from the card (1). The identification data (21) of the card (1) of the user authorized to use the radio telephone concerned are recorded in the non-erasable memory (5) of the processor (4), whereupon the radio telephone shifts into a mode locked to this card in such a way that its use is possible with only a certain card (1). By means of this method, protection is achieved against unauthorized use of the radio telephone.

3 Claims, 2 Drawing Sheets

METHOD FOR LOCKING TO THE USER'S CARD IN A PORTABLE RADIO TELEPHONE

The invention relates to a mobile radio telephone, in particular to a method for the use of a portable radio telephone operating in a public radio telephone network which has not only the radio telephone parts but also a processor which controls and supervises the operation and has a non-erasable read-write memory, a keyboard and a display, and a card reader, in which case, when the radio telephone is set up for a telephone connection, the user identification data required by the radio telephone system are read from the present card inserted in the card reader.

One example of such a radio telephone is the telephone working in the German NETZ-C network.

The magnetic card required for the use of a NETZ-C radio telephone is a plastic card, the size of a normal credit card, provided with a magnetic strip. This card has all the information required by the system regarding the user. The possessor of the card may feed his card into any NETZ-C telephone and use the telephone with his own identification code, without the system knowing anything about the origin of the telephone itself.

Owing to the above, stealing a portable telephone may become tempting. If the thief is not caught red-handed, tracing the telephone later is nearly impossible.

The object of the invention is to provide sufficient protection in the telephone itself against unauthorized use.

According to the invention, this protection is implemented by means of the system by recording in the memory of a portable radio telephone the identification data of the card of one specific user authorized to use the radio telephone concerned, whereupon the radio telephone shifts to the locked mode, locked to this user's card, in such a way that the use of the radio telephone in the mode locked to the user card is possible only with the help of the card designated for it, and that unlocking, whereupon a shift is made back to the unlocked mode, is possible only with the help of the card the identification data of which were recorded in the memory of the processor at the time of shifting to the locked mode.

Protecting a telephone against unauthorized use is known per se, but the question has always been of locking the telephone apparatus itself or its operation. However, the locking of the telephone apparatus alone does not provide sufficient protection, since opening the locking code is in principle possible by experimenting with a sufficient number of codes, if the telephone allows the locking code to be keyed in using any card.

According to the invention, the radio telephone thus has, available for the user to choose, a locking level the activation of which locks the telephone to the magnetic card in the card reader at that moment. The telephone functions completely normally as long as the correct card in in the telephone, but if an attempt is made to use the apparatus with a wrong card, its operation is prevented. If the telephone locked to a card is stolen together with the card, calls made using the card concerned can be prevented at the system level.

In another embodiment of the invention, a locking key is provided in the keyboard for the user to press in order to shift the radio telephone to the locked mode and out of it.

According to the invention it is also possible to use for the locking for example a four-digit code by means of which the card locking is activated. The locking code and the identification code on the card may also be recorded in the indelible memory of the telephone. After the card is fed in, the identification code on the card is compared with the identification code recorded in the memory, and when the card is the correct one the telephone functions normally but, in the case of a wrong card, operation is prevented. The unlocking can be done with the same card as was used for activating the locking, by keying in the correct locking code.

A mobile radio telephone may be made up of a separate operating apparatus (a handset) and a radio unit, each of them having a separate processor. In this case the locking concerns both the operating apparatus and the radio unit.

By this solution a protection has been achieved in which both the operating apparatus and the radio unit are locked to the same card, in which case not even the stealing of the operating apparatus alone would be worth while.

In the event that the operating apparatus does not have its own separate processor, the locking is implemented in the processor which controls the whole telephone. Such one processor apparatus could be, for example, hand telephones without a separate operating unit.

The card locking can be implemented completely via the program. The card locking is seen on the user interface as only one locking level, which the user may select when he so desires. All that is needed additionally is routines for the identification comparison and for preventing the functioning of the telephone.

The user card may be a plastic card, the size of a credit card, provided with a magnetic strip, or some other card suitable for the purpose, for example a so-called "intelligent" card provided with a processor.

The method according to the invention is described below with the aid of an embodiment example depicted in the drawing.

Figure 2:
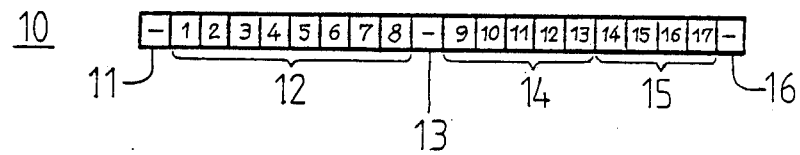
Figure 3:
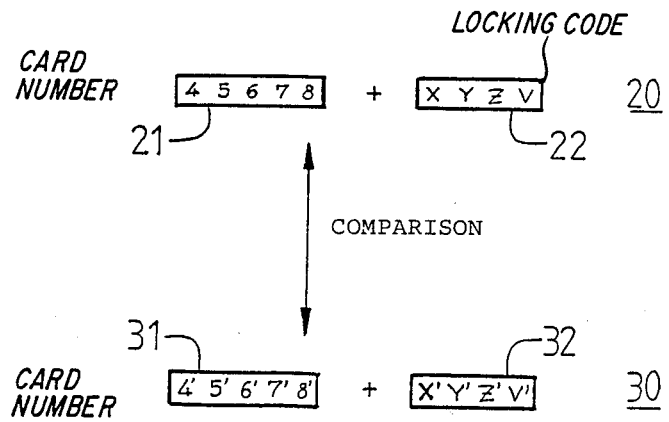
Figure 4:
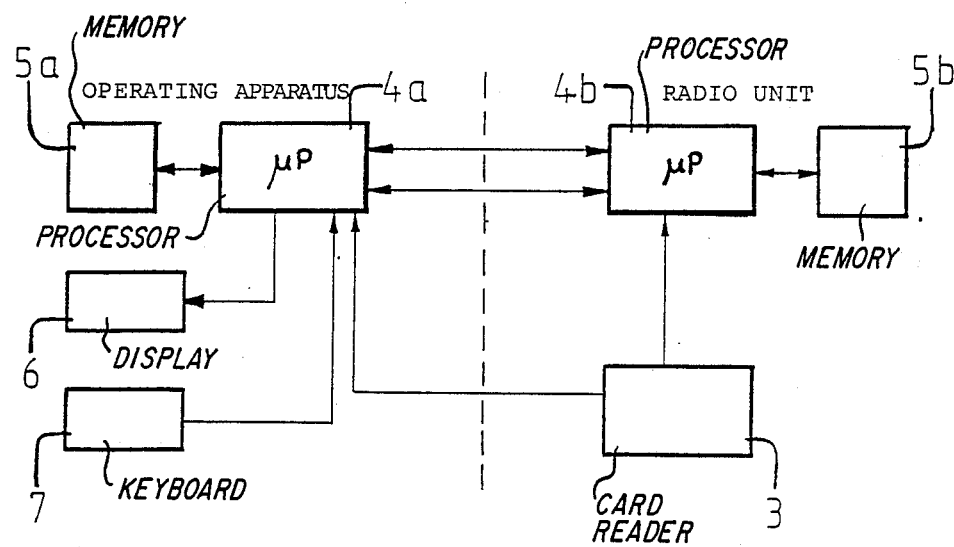

In the drawing,

FIG. 1: a block diagram of the principle of a portable radio telephone to the extent that it pertains to the invention;

FIG. 2: a representation of the principle of the identification data contained in the user's magnetic card;

FIG. 3: an illustrative picture of the comparison of the locking code in the memory and the code which is fed in; and FIG. 4: a block diagram of the principle of a portable radio telephone when the apparatus is made up of a separate operating apparatus and a radio unit.

The method works in such a way that, when the user wishes to lock the radio telephone depicted as a block diagram in FIG. 1 to a certain magnetic card 1, he feeds the card into the magnetic card reader 3 in the telephone, activates the locking by pressing the locking key 8 in the keyboard, and keys in a four-digit locking code from the keyboard 7. At this time the telephone number (FIG. 2) or its part 12 on the card 1 is recorded, together with the locking code 22, into the indelible memory 5 of the telephone. (The data contained in the magnetic card depicted in FIG. 2 pertain to the use of the radio telephone system, which is not explained here in greater detail.)

When the magnetic card 1 is fed into the card reader 3 the next time, before the initiation of the registration into the network the card number 21 recorded in the memory 5 and the number 31 in the card which is fed in are compared. If the numbers agree in the comparison of FIG. 3, the operation proceeds normally. But, if the card 1 is wrong, i.e. 4′–8′ (31) differ from numbers 4–8 (21) the telenumbers phone will not register in the network and will not accept any commands from the keyboard 7. Thus the unauthorized use of the radio telephone, without the correct magnetic card 1, is more or less completely prevented. It is possible to unlock the card locking by activating the unlocking by means of key 8 in the keyboard and by keying in the locking code 22 given at the time of the locking.

The operation of the parts of the radio telephone and, for example, the keying in, recording and comparison of the numbers are controlled by a microprocessor uP (4) in a manner known per se, not explained here in greater detail.

Since according to FIG. 4 the mobile radio telephone is made up of a separate operating apparatus (=handset) and a radio unit, each having its own processor 4a and 4b, the locking concerns both the operating apparatus and the radio unit. This means that the same identification code (shown in FIG. 3 has been recorded in the indelible memories 5a and 5b of both the operating apparatus and the radio unit. After the feeding in of the card 1, both the operating apparatus and the radio unit compare the identification information in their memories to both the identification code received from the card and that keyed in. Thereafter the processors of both units exchange information regarding the correctness of the identification code according to a certain data transfer protocol; both processors must agree regarding the correctness of the identification code before a call is initiated normally.

According to the invention, the disadvantages of conventional locking, mentioned earlier, have been eliminated in such a way that the telephone will not register in the network and will not accept commands from the keyboard, i.e. the telephone is completely "dumb", if a wrong card 1 is fed into the card reader 3.

I claim:

1. A method for use in a mobile radio telephone operable in a general telephone network having radio telephone parts, a processor, a non-erasable read/write memory which controls and supervises operation, a keyboard, a display, a card reader, and a readable card, said method comprising the steps of:
    setting up said radio telephone for a call;
    reading user identification data required by said telephone into said card reader from said card;
    recording said identification data of said card of a specific user authorized to use said radio telephone into said memory of said processor;
    shifting said radio telephone to a locked mode;
    locking said card into said radio telephone, wherein said step of locking of said card is such that the use of said radio telephone in said locked mode is possible only with the use of said card which is specifically designated for said radio telephone; and
    shifting to an unlocking mode, wherein the step of shifting to said unlocking mode is possible with said card having said identification data having been recorded in said memory at the time of shifting to said locked mode.

2. A method according to claim 1, wherein the step of shifting to the locked mode and out of it comprises the step of pressing a locking key arranged in the keyboard.

3. A method according to claim 1 or 2, wherein the step of shifting to the locked mode and out of it further comprises the step of keying in a several-digit code.

* * * * *